United States Patent
Reinhardt

(10) Patent No.: US 11,593,174 B2
(45) Date of Patent: Feb. 28, 2023

(54) SYSTEMS AND METHODS FOR SCHEDULING PROGRAMS FOR DEDICATED EXECUTION ON A QUANTUM PROCESSOR

(71) Applicant: D-WAVE SYSTEMS INC., Burnaby (CA)

(72) Inventor: Steven P. Reinhardt, Eagan, MN (US)

(73) Assignee: D-WAVE SYSTEMS INC., Burnaby (CA)

( * ) Notice: Subject to any disclaimer, the term of this patent is extended or adjusted under 35 U.S.C. 154(b) by 603 days.

(21) Appl. No.: 16/601,097

(22) Filed: Oct. 14, 2019

(65) Prior Publication Data
US 2020/0117511 A1    Apr. 16, 2020

Related U.S. Application Data

(60) Provisional application No. 62/746,365, filed on Oct. 16, 2018.

(51) Int. Cl.
*G06F 9/50*    (2006.01)
*G06N 10/00*    (2022.01)
(Continued)

(52) U.S. Cl.
CPC .......... *G06F 9/5038* (2013.01); *G06F 9/461* (2013.01); *G06F 9/485* (2013.01); *G06F 9/4881* (2013.01);
(Continued)

(58) Field of Classification Search
CPC ........ G06F 9/5038; G06F 9/461; G06F 9/485; G06F 9/4881; G06F 2209/501; G06F 9/5044; G06N 10/00
See application file for complete search history.

(56) References Cited

U.S. PATENT DOCUMENTS 1,102,227 A    7/1914    Baird
7,135,701 B2    11/2006    Amin et al.
(Continued)

FOREIGN PATENT DOCUMENTS

KR    20160132943 A    11/2016
KR    20180067006 A    6/2018
(Continued)

OTHER PUBLICATIONS

Amin, "Effect of Local Minima on Adiabatic Quantum Optimization," Physical Review Letters 100(130503), 2008, 4 pages.
(Continued)

*Primary Examiner* — Michael W Ayers
(74) *Attorney, Agent, or Firm* — Cozen O'Connor

(57) ABSTRACT

Systems and methods for scheduling usage time for programs that can be executed on a hybrid computing system including a quantum processing unit (QPU) and a central processing unit (CPU). Programs can comprise both QPU-executable tasks and CPU-executable tasks. Some programs can be considered high performance programs that are intolerant of interruptions to QPU-executable tasks and some programs can be considered low performance programs that are tolerant of interruptions to QPU-executable tasks. After a high performance program finishes executing QPU-executable tasks on a QPU, a low performance program may execute QPU-executable tasks on the QPU while the high performance program executes CPU-executable tasks on a CPU. Execution of QPU-executable tasks of a low performance program on a QPU can pause or stop if a high performance program is queued.

10 Claims, 3 Drawing Sheets

(51) Int. Cl.
*G06F 9/48* (2006.01)
*G06F 9/46* (2006.01)
(52) U.S. Cl.
CPC .......... *G06N 10/00* (2019.01); *G06F 9/5044* (2013.01); *G06F 2209/501* (2013.01)

(56) References Cited

U.S. PATENT DOCUMENTS

| | | | |
|---|---|---|---|
| 7,369,035 | B2 | 5/2008 | Konno et al. |
| 7,398,163 | B2 | 7/2008 | Tsukamoto et al. |
| 7,418,283 | B2 | 8/2008 | Amin |
| 7,533,068 | B2 | 5/2009 | Maassen et al. |
| 7,619,437 | B2 | 11/2009 | Thom et al. |
| 7,639,035 | B2 | 12/2009 | Berkley |
| 7,870,087 | B2 | 1/2011 | Macready et al. |
| 7,870,523 | B1 | 1/2011 | Uziel et al. |
| 7,876,248 | B2 | 1/2011 | Berkley et al. |
| 7,898,282 | B2 | 3/2011 | Harris et al. |
| 7,984,012 | B2 | 7/2011 | Coury et al. |
| 8,008,942 | B2 | 8/2011 | Van Den Brink et al. |
| 8,035,540 | B2 | 10/2011 | Berkley et al. |
| 8,190,548 | B2 | 5/2012 | Choi |
| 8,195,596 | B2 | 6/2012 | Rose et al. |
| 8,195,726 | B2 | 6/2012 | Macready et al. |
| 8,283,943 | B2 | 10/2012 | Van Den Brink et al. |
| 8,421,053 | B2 | 4/2013 | Bunyk et al. |
| 8,437,818 | B1 | 5/2013 | Tolpygo et al. |
| 8,464,542 | B2 | 6/2013 | Hilton et al. |
| 8,494,993 | B2 | 7/2013 | Harris et al. |
| 9,875,444 | B2 | 1/2018 | King |
| 9,898,689 | B2 | 2/2018 | Shamaie |
| 10,031,887 | B2 | 7/2018 | Raymond |
| 10,169,445 | B2 | 1/2019 | Weinstein et al. |
| 10,552,755 | B2 | 2/2020 | Lanting et al. |
| 10,846,366 | B1 | 11/2020 | Otterbach et al. |
| 11,062,227 | B2 | 7/2021 | Amin et al. |
| 11,194,573 | B1* | 12/2021 | Smith ........................ G06F 8/41 |
| 11,288,121 | B2 | 3/2022 | Katabarwa |
| 2002/0163518 | A1 | 11/2002 | Rising et al. |
| 2005/0224784 | A1 | 10/2005 | Amin et al. |
| 2006/0225165 | A1 | 10/2006 | Maassen et al. |
| 2007/0239366 | A1 | 10/2007 | Hilton et al. |
| 2008/0065573 | A1 | 3/2008 | Macready |
| 2009/0070402 | A1 | 3/2009 | Rose et al. |
| 2009/0075825 | A1 | 3/2009 | Rose et al. |
| 2009/0232191 | A1 | 9/2009 | Gupta et al. |
| 2009/0299947 | A1 | 12/2009 | Amin et al. |
| 2010/0281885 | A1 | 11/2010 | Black et al. |
| 2011/0022820 | A1 | 1/2011 | Bunyk et al. |
| 2011/0060710 | A1 | 3/2011 | Amin |
| 2011/0065585 | A1 | 3/2011 | Lanting et al. |
| 2011/0231462 | A1 | 9/2011 | Macready et al. |
| 2011/0298489 | A1 | 12/2011 | Van et al. |
| 2013/0117200 | A1 | 5/2013 | Thom |
| 2013/0282636 | A1 | 10/2013 | Macready et al. |
| 2014/0025606 | A1 | 1/2014 | Macready |
| 2014/0187427 | A1 | 7/2014 | Macready et al. |
| 2014/0337612 | A1 | 11/2014 | Williams |
| 2015/0269124 | A1 | 9/2015 | Hamze et al. |
| 2015/0297949 | A1 | 10/2015 | Aman et al. |
| 2015/0358022 | A1 | 12/2015 | Mcdermott et al. |
| 2015/0363708 | A1 | 12/2015 | Amin et al. |
| 2016/0321559 | A1 | 11/2016 | Rose et al. |
| 2017/0177534 | A1 | 6/2017 | Mohseni et al. |
| 2017/0255629 | A1 | 9/2017 | Thom et al. |
| 2017/0255872 | A1 | 9/2017 | Hamze et al. |
| 2017/0300817 | A1 | 10/2017 | King et al. |
| 2017/0323195 | A1 | 11/2017 | Crawford et al. |
| 2018/0046933 | A1* | 2/2018 | La Cour ............... G06F 12/023 |
| 2018/0091440 | A1* | 3/2018 | Dadashikelayeh ... G06F 16/951 |
| 2018/0096085 | A1 | 4/2018 | Rubin |
| 2018/0218279 | A1 | 8/2018 | Lechner et al. |
| 2018/0246848 | A1 | 8/2018 | Douglass et al. |
| 2018/0246851 | A1 | 8/2018 | Zaribafiyan et al. |
| 2018/0260245 | A1* | 9/2018 | Smith ..................... G06N 10/00 |
| 2018/0336166 | A1 | 11/2018 | Forster |
| 2018/0365585 | A1* | 12/2018 | Smith ................... G06F 9/5027 |
| 2019/0019101 | A1 | 1/2019 | Neven |
| 2020/0005186 | A1 | 1/2020 | Romero et al. |
| 2020/0026551 | A1* | 1/2020 | Ducore .................. G06F 15/80 |
| 2020/0027029 | A1 | 1/2020 | Linvill |
| 2020/0073739 | A1 | 3/2020 | Rungta et al. |
| 2020/0089832 | A1 | 3/2020 | Shao et al. |
| 2020/0134502 | A1 | 4/2020 | Anschuetz et al. |
| 2020/0226197 | A1 | 7/2020 | Woerner et al. |
| 2020/0234172 | A1 | 7/2020 | King et al. |
| 2021/0097776 | A1 | 4/2021 | Faulkner et al. |
| 2021/0334081 | A1 | 10/2021 | Chong et al. |
| 2021/0357797 | A1* | 11/2021 | Karalekas .............. G06N 10/00 |
| 2022/0019928 | A1 | 1/2022 | Jiang et al. |

FOREIGN PATENT DOCUMENTS

| | | |
|---|---|---|
| WO | 2009152180 A2 | 12/2009 |
| WO | 2012064974 A2 | 5/2012 |
| WO | 2013006836 A1 | 1/2013 |
| WO | 2015143439 A1 | 9/2015 |
| WO | 2018119522 A1 | 7/2018 |

OTHER PUBLICATIONS

B. Bauer et al., "Hybrid Quantum Classical Approach to Correlated Materials", arXiv.1510.03859V2, Aug. 29, 2016.

Booth, M. et al., "Partitioning Optimization Problems for Hybrid Classical/Quantum Execution," D-Wave Technical Report, Jan. 9, 2017, 13 pages.

E. Blanzieri et al., "Quantum Annealing Tabu Search for QUBO Optimization", arXiv.1810.09342V1, Oct. 22, 2018.

Inoue et al. "Simulation and Experimental Demonstration of Logic Circuits Using an Ultra-Low-Power Adiabatic Quantum-Flux-Parametron," in IEEE Transactions on Applied Superconductivity, vol. 23, No. 3, pp. 1301105-1301105, Jun. 2013.

International Search Report and Written Opinion for PCT/US2020/013366, dated May 7, 2020, 9 pages.

Notice of Allowance dated Feb. 2, 2022, for Thom, "Systems and Methods for Analog Processing of Problem Graphs Having Arbitrary Size and/or Connectivity" U.S. Appl. No. 16/778,295; 29 pages.

O. A. Mukhanov, "Energy-Efficient Single Flux Quantum Technology," in IEEE Transactions on Applied Superconductivity, vol. 21, No. 3, pp. 760-769, Jun. 2011, doi: 10.1109/TASC.2010.2096792.

Pastorello, D. et al., "Quantum Annealing Learning Search for Solving QUBO Problems," arXiv:1810.09342v3 [quant-ph] Aug. 13, 2019, 17 pages.

S. R. Ekanayake, T. Lehmann, A. S. Dzurak and R. G. Clark, "Quantum bit controller and observer circuits in SOS-CMOS technology for gigahertz low-temperature operation," 2007 7th IEEE Conference on Nanotechnology (IEEE NANO), 2007, pp. 1283-1287.

Fran, T. et al., "A Hybrid Quantum-Classical Approach to Solving Scheduling Problems," Proceedings of the Ninth International Symposium on Combinational Search, 2016, 9 pages.

Williams, "Systems and Methods for Interacting With a Quantum Computing System," U.S. Appl. No. 61/811,457, filed Apr. 12, 2013, 55 pages.

Wocjan, Pawel, and Anura Abeyesinghe. "Speedup via quantum sampling." Physical Review A 78.4 (2008): 042336.

Non-Final Office Action Issued in U.S. Appl. No. 16/997,252 dated May 26, 2022, 13 pages.

Non-Final Office Action dated Jun. 3, 2022 in U.S. Appl. No. 16/741,208.

Notice of Allowance for U.S. Appl. No. 16/830,650, dated Jul. 15, 2022, 11 pages.

* cited by examiner

SYSTEMS AND METHODS FOR SCHEDULING PROGRAMS FOR DEDICATED EXECUTION ON A QUANTUM PROCESSOR

FIELD

This disclosure generally relates to methods for scheduling usage time for programs that can be executed on a hybrid computing system that includes a quantum processing unit and a central processing unit.

BACKGROUND

Quantum Computation

A quantum computer is a system that makes direct use of at least one quantum-mechanical phenomenon, such as superposition, tunneling, and entanglement, to perform operations on data. The elements of a quantum computer are qubits. Quantum computers can provide speedup for certain classes of computational problems such as computational problems simulating quantum physics.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. Quantum annealing may use quantum effects, such as quantum tunneling, as a source of delocalization to reach an energy minimum more accurately and/or more quickly than classical annealing.

Adiabatic quantum computation may be considered a special case of quantum annealing. In adiabatic quantum computation, ideally, the system begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. An objective function, such as an optimization problem, is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P$$

where $A(t)$ and $B(t)$ are time dependent envelope functions. For example, $A(t)$ can change from a large value to substantially zero during the evolution and $H_E$ can be thought of as an evolution Hamiltonian. The disorder is slowly removed by removing $H_D$ (i.e., by reducing $A(t)$).

Thus, in quantum annealing, the system starts with an initial Hamiltonian and evolves through an evolution Hamiltonian to a final "problem" Hamiltonian $H_P$ whose ground state encodes a solution to the problem.

Hybrid Computing System Comprising a Quantum Processor

A hybrid computing system can include a digital computer communicatively coupled to an analog computer. In some implementations, the analog computer is a quantum computer and the digital computer is a classical computer. A quantum computer can be a gate-model quantum computer or a quantum computer that performs adiabatic quantum computation. The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

Using a quantum processor to solve problems can be computationally expensive. Some problems, such as machine learning problems that implement large training set, require many iterations, and thus can necessitate heavy usage of computation resources on a quantum processing unit (QPU).

Algorithms for scheduling programs on central processing units (CPUs) of a digital computer exist but are not typically suitable for QPUs due to architectural differences between CPUs of a digital computer and QPUs of an analog computer. There is thus a general desire for systems and methods for scheduling high demand programs and low demand programs on a QPU to maximize use of computational resources while maintaining performance.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to be able to schedule one or more programs on a hybrid computing system that includes an analog computer having a QPU and a classical computer having a CPU. Systems and methods are described which, at least in some implementations, allow for exploiting unused computational resources on the QPU to execute one or more programs on a hybrid computing system.

A method to allocate time on a quantum processing unit (QPU) between one or more programs in a hybrid computing system comprising at least one central processing unit (CPU) of a digital computer and the QPU, may be summarized as including: receiving a first program at the QPU from a queue; executing at least a portion of a plurality of quantum machine instructions (QMIs) of the first program on the QPU for a fixed time duration for executing the plurality of QMIs of the first program on the QPU; after the fixed time duration, determining whether each QMI of the plurality of QMIs of the first program has been executed; determining whether to preserve a respective state of each QMI of the plurality of QMIs of the first program based on the determination of whether each QMI of the plurality of QMIs of the first program has been executed; receiving a second program at the QPU from the queue; and executing a plurality of CPU-executable instructions of the first program on the CPU of the digital computer while executing on the QPU at least a portion of QMIs of a plurality of QMIs of the second program.

The method may further include preserving the respective state of each QMI of the plurality of QMIs of the first program in response to determining to preserve the respective state of each QMI of the plurality of QMIs of the first program based on a determination that at least one QMI of the plurality of QMIs of the first program has not been executed. Such may, for example include preserving results of one or more completed annealing cycles and waveforms of the first program for later resumption.

The method may further include: after executing the plurality of CPU-executable instructions of the first program on the CPU of the digital computer and while executing on the QPU at least a portion of QMIs of the plurality of QMIs of the second program, preserving a respective state of each QMI of the plurality of QMIs of the second program; and after preserving the respective state of each QMI of the plurality of QMIs of the second program, resuming execution of each QMI of the plurality of QMIs of the first program from the preserved state of each QMI of the plurality of QMIs of the first program.

The method may further include: determining there is at least one additional program in the queue; for each of a number n of additional programs in the queue, executing at least a portion of a plurality of quantum machine instructions (QMIs) of an $i^{th}$ one of the additional programs on the QPU for a fixed time duration for executing the plurality of QMIs of the $i^{th}$ one of the additional programs on the QPU; after the fixed time duration, determining whether each QMI of the plurality of QMIs of the $i^{th}$ one of the additional programs has been executed; determining whether to preserve a respective state of each QMI of the plurality of QMIs of the $i^{th}$ one of the additional programs based on the determination of whether each QMI of the plurality of QMIs of the $i^{th}$ one of the additional programs program has been executed; receiving an $(i+1)^{th}$ one of the additional programs at the QPU from the queue; and executing a plurality of CPU-executable instructions of the $i^{th}$ one of the additional programs on the CPU of the digital computer while executing on the QPU at least a portion of QMIs of a plurality of QMIs of the $(i+1)^{th}$ one of the additional programs, where n and i are each integers.

The method may further include: the executing at least a portion of the plurality of QMIs of the first program on the QPU for a fixed time duration includes executing each QMI of the plurality of QMIs of the first program on the QPU; and the determining whether to preserve a respective state of each QMI of the plurality of QMIs of the first program includes determining to not preserve a respective state of each QMI of the plurality of QMIs of the first program based on a determination that each QMI of the plurality of QMIs of the first program has been executed on the QPU.

The method may further include; receiving the first program and the second program from an external system; receiving an indication of the fixed time duration for executing the plurality of QMIs of the first program from the external system; queuing the first program and the second program in a user queue of the queue; before the executing the at least a portion of the plurality of quantum machine instructions (QMIs) of the first program, selecting the first program from the queue; and before the executing on the QPU the at least a portion of QMIs of the plurality of QMIs of the second program, selecting the second program from the queue.

A method to allocate time on a quantum processing unit (QPU) between one or more programs in a hybrid computing system comprising at least one central processing unit (CPU) of a digital computer and the QPU, may be summarized as including: receiving a first program at the QPU from the queue; executing each of a plurality of quantum machine instructions (QMIs) of the first program on the QPU; checking at incremental time durations for completion of execution the plurality of QMIs of the first program on the QPU; receiving a second program at the QPU from the queue; executing a plurality of CPU-executable instructions of the first program on the CPU of the digital computer while executing on the QPU at least a portion of QMIs of a plurality of QMIs of the second program; and preserving a respective state of each QMI of the plurality of QMIs of the second program.

Preserving the respective state of each QMI of the plurality of QMIs of the second program may include preserving results of completed annealing cycles and waveforms of the second program for later resumption.

The method may further include: determining that each CPU-executable instruction of the plurality of CPU-executable instructions of the first program has been executed on the CPU of the digital computer; and in response the determination that each CPU-executable instruction of the plurality of CPU-executable instructions of the first program has been executed on the CPU of the digital computer, pausing or stopping the execution on the QPU of the at least a portion of QMIs of the plurality of QMIs of the second program.

Pausing or stopping the executing on the QPU of the at least a portion of QMIs of the plurality of QMIs of the second program may include pausing or stopping the execution of a QMI at a point after an end of a first annealing cycle and a start of a second annealing cycle Preserving the respective state of each QMI of the plurality of QMIs of the second program may include preserving the respective state of each QMI of the plurality of QMIs of the second program in response to the pausing or stopping the executing on the QPU of the at least a portion of QMIs of the plurality of QMIs of the second program.

The method may further include: determining there is at least one additional program in the queue; for each of a number n of additional programs in the queue, receiving an $i^{th}$ one of the additional programs at the QPU from a queue; executing each of a plurality of quantum machine instructions (QMIs) of the $i^{th}$ one of the additional programs on the QPU; checking at incremental time durations for completion of execution the plurality of QMIs of the $i^{th}$ one of the additional programs on the QPU; receiving an $(i+1)^{th}$ one of the additional programs at the QPU from the queue; executing a plurality of CPU-executable instructions of the $i^{th}$ one of the additional programs on the CPU of the digital computer while executing on the QPU at least a portion of QMIs of a plurality of QMIs of the $(i+1)^{th}$ one of the additional programs; and preserving a respective state of each QMI of the plurality of QMIs of the $(i+1)^{th}$ one of the additional programs.

The method may further include estimating an increment of time of the incremental time durations to be an estimated time for completion of execution the plurality of QMIs of the first program on the QPU.

The method may further include: receiving the first program and the second program from an external system; queuing the first program and the second program the queue; before the executing each QMI of the plurality of quantum machine instructions (QMIs) of the first program on the QPU, selecting the first program from the queue; and before the executing on the QPU at least a portion of QMIs of a plurality of QMIs of the second program, selecting the second program from the queue.

Receiving from the queue the first program at the QPU may include receiving the first program from one of a series of user queues for problems of a certain fixed time duration.

Selecting the first program from the queue may include selecting the first program from the queue based on a project priority specified by the external system, the fixed time duration, and a number of user queues in the queue.

Selecting the second program from the queue may include selecting the second program from the queue based on a project priority specified by the external system, the fixed time duration, and a number of user queues from which programs are selected Receiving from the queue the first program at the QPU may include receiving a high performance program that includes QMIs that are intolerant of interruptions during execution on a QPU.

Receiving from the queue the second program at the QPU may include receiving a low performance program that includes QMIs that are tolerant of interruptions during execution on a QPU.

A hybrid computational system may be summarized as including: a quantum processing unit (QPU) comprising a plurality of qubits and couplers, the couplers operable to couple qubits; at least one processor in communication with the QPU; and at least one nontransitory processor-readable storage medium that stores at least one of processor-executable instructions or data which, when executed by the at least one processor, cause the at least one processor to execute any of the above methods.

A hybrid computational system may be summarized as including: a quantum processing unit (QPU) comprising a plurality of qubits and couplers, the couplers operable to couple qubits; at least one processor in communication with the QPU; and at least one nontransitory processor-readable storage medium that stores at least one of processor-executable instructions or data which, when executed by the at least one processor, cause the at least one processor to execute any of the above methods.

A hybrid computational system may be summarized as including: at least one processor in communication with a quantum processing unit (QPU); and at least one nontransitory processor-readable storage medium that stores at least one of processor-executable instructions or data which, when executed by the at least one processor, cause the at least one processor to execute any of the above methods.

A hybrid computational system may be summarized as including: at least one processor in communication with a quantum processing unit (QPU); and at least one nontransitory processor-readable storage medium that stores at least one of processor-executable instructions or data which, when executed by the at least one processor, cause the at least one processor to execute any of the above methods.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements, as drawn, are not necessarily intended to convey any information regarding the actual shape of the particular elements, and may have been solely selected for ease of recognition in the drawings.

DETAILED DESCRIPTION

Figure 1:
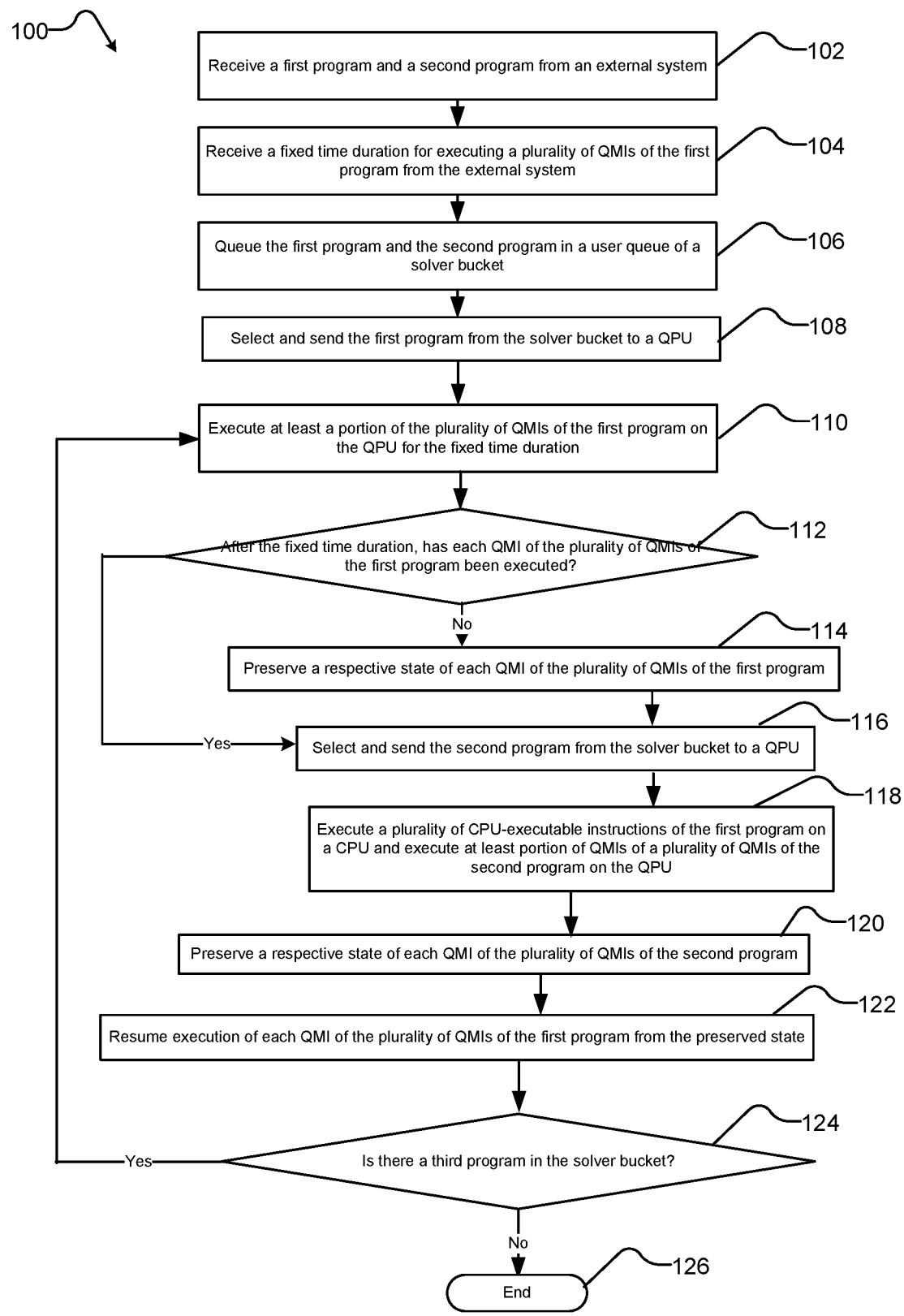
FIG. 1 is a flowchart illustrating a method for executing QMIs of a program for a specified fixed time duration with state preservation of a first program and a second program.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

A hybrid computing system can include a digital computer that includes a CPU and an analog computer that includes a QPU. An example of such a hybrid computing system is described in U.S. Pat. No. 9,727,527. Programs can include a set of tasks that are sometimes referred to as quantum machine instructions (QMIs). QMIs can be sent to a QPU to be executed. A hybrid computing system can require a QPU to work in conjunction with a CPU which requires careful consideration of scheduling programs for execution.

One traditional approach for scheduling usage time on a device that is commonly used in CPU scheduling is to allocate the entire device to a program for the duration of fully executing the program. A benefit of such an approach (i.e., a dedicated approach) is a lower risk of interference from other tasks or programs. However, a cost to this benefit is that the device is entirely unavailable to other tasks or programs. In general, the dedicated approach can be implemented on CPUs with few issues because CPUs are inexpensive and numerous. The number of CPUs can be easily scaled with the number of programs that need to be executed. For example, such an approach can be implemented on a multicore computing system (e.g., supercomputer) that includes a plurality of CPUs. However, the same approach cannot be easily implemented on QPUs because QPUs are expensive and rare.

A program can comprise a first set of tasks that can be executed on a QPU and a second set of tasks that can be executed on a CPU. The first set of tasks that are QPU-executable can be intolerant of interruptions during execution on the QPU and can require dedication or near-dedication of the QPU. However, the QPU can remain idle (i.e., not executing a task) while the second set of tasks is executing on the CPU. While the second set of tasks is being executed on the CPU, the QPU may be unemployed. Thus, the program can demand long usage times on the QPU that are not entirely necessary since the QPU is in idle while the second set of tasks of the program are being executed on the CPU. For example, benchmarking or calibration programs for improving or maintaining quality of a QPU can comprise a second set of tasks that are CPU-executable and a first set of tasks that are QPU-executable. It is desirable that the first set of tasks be executed on a QPU without interruption. Such programs that include a set of tasks for which it is desired they be executed on a QPU without interruption (i.e., tasks for which dedication of the QPU is desirable) can be referred to as "high performance programs" in the present specification.

Alternatively, a program can include a first set of tasks that are QPU-executable and a second set of tasks that are CPU-executable, wherein the first set of tasks is tolerant of interruptions during execution on the QPU. Thus, these programs typically do not require dedication or near-dedication of the QPU, and do not demand long continuous usage times on the QPU. Such programs can be referred to as "low performance programs" in the present specification. QPU-executable tasks can be referred to as "quantum machine instructions" or "QMIs" throughout the present specification.

Using a dedicated approach of allocating a QPU to a program for the full execution period can undesirably result in a high performance program using the QPU for more time that necessary. As a result, low performance programs and other programs remain in a queue until the high performance program is fully executed, despite the high performance program not necessarily requiring the QPU for all tasks (e.g., CPU-executable tasks). This can be undesirable if other programs in queue are urgent or high priority to a user and the QPU is inaccessible due to idle QPU cycles or anneal cycles. The dedicated approach may not be suitable for a QPU that needs to run high performance programs, low performance programs, and other programs. Therefore, there is a need for QPU-scheduling approaches that can maintain QPU performance for QPU-executable tasks of a high performance program, and can simultaneously enable QPU exploitation by other programs without detracting execution of the high performance program.

The present systems, methods, and devices describe approaches for delivering dedication or near-dedication of a QPU for QPU-executable tasks of a high performance program, while exploiting idle QPU cycles or anneal cycles to execute tasks of a low performance program. These approaches include a plurality of methods to allocate time on a QPU between one or more programs simultaneously.

FIG. 1 is a flowchart illustrating a method 100 for executing QMIs of a first program for a specified fixed time duration and preserving a respective state of QMIs of a first program. A state of QMIs can include, for example, whether the QMI is pending, in progress, completed, or cancelled. When a QMI is in progress a partial result of the QMI is preserved. Method 100 includes acts 102-126, though in other implementations, certain acts can be omitted and/or additional acts can be added. Method 100 begins at act 102, for example in response to a user submitting a program or a problem to a scheduler and/or solver on the CPU.

At 102, a first program and a second program are each received from an external system. The first program can be a high performance program that includes QMIs that are intolerant of interruptions during execution on a QPU. The second program can be a low performance program that includes QMIs that are tolerant of interruptions during execution on a QPU. For example, a high performance program can be received from a user, a CPU, or another element of a classical computing system.

At 104, a fixed time duration for executing a plurality of QMIs of the first program is received from the external system. For example, the fixed time duration can be specified by a user.

At 106, the first program and the second program are each queued in a user queue of a solver bucket. The solver bucket can include a series of user queues for problems of a certain fixed time duration (e.g., the fixed time duration specified by the user).

At 108, the first program is selected from the solver bucket and sent from the solver bucket to a QPU. In one implementation, a probability of selecting the first program from the solver bucket depends on a project priority specified by an external system (e.g., a user), the fixed time duration, and a number of user queues in the solver bucket.

At 110, at least a portion of the plurality of QMIs of the first program is executed on the QPU for the fixed time duration. For example, a set of QMIs of a high performance program can be executed on a QPU for a fixed time duration that is specified by a user at act 104.

At 112, if each QMI of the plurality of QMIs of the first program has been executed after the fixed time duration, act 116 is performed. If each QMI of the plurality of QMIs of the first program has not been executed after the fixed time duration (i.e., if there are unexecuted QMIs in the plurality of QMIs of the first program), act 114 is performed.

At 114, a respective state of each QMI of the plurality of QMIs of the first program is preserved. For example, results of completed annealing cycles and waveforms of a high performance program can be preserved for later resumption. In one implementation, a respective state of each QMI is preserved after the ongoing annealing cycle is ended by quenching. In the present disclosure and appended claims, the term 'quench' or 'quenching' is used to indicate a variation in the annealing cycle where the annealing process is abruptly terminated. In one implementation, a respective state of each QMI is preserved at a point between an end of a first anneal cycle and a start of a second anneal cycle.

At 116, the second program is selected from the solver bucket and sent from the solver bucket to a QPU. For example, a low performance program can be selected from the solver bucket and sent to a QPU. In one implementation, a probability of selecting the second program from the solver bucket is dependent on a project priority specified by an external system (e.g., a user), the fixed time duration, and a number of user queues in the solver bucket.

At 118, a plurality of CPU-executable instructions of the first program is executed on a CPU and at least a portion of a plurality of QMIs of a second program is executed on the QPU. Executing CPU-executable instructions of the first program and executing at least a portion of the plurality of QMIs of the second program can occur simultaneously. In one implementation, executing at least a portion of the plurality of QMIs of the second program on a QPU can pause or stop (e.g., by quenching) when each CPU-executable instruction of the plurality of CPU-executable instructions of the first program has been executed on the CPU at the end of an annealing cycle.

At 120, a respective state of each QMI of the plurality of QMIs of the second program is preserved. For example, results of completed annealing cycles and waveforms of a low performance program can be preserved for later resumption. In one implementation, a respective state of each QMI is preserved after the ongoing annealing cycle is ended by quenching. In one implementation, a respective state of each QMI is preserved at a point between an end of a first anneal cycle and a start of a second anneal cycle.

At 122, execution of each QMI of the plurality of QMIs of the first program is resumed from the preserved state (i.e., the state that was preserved at act 118). Act 122 can continue until each QMI of the plurality of QMIs of the first program is executed.

At 124, if there is a third program in the solver bucket, act 110 is performed wherein the second program replaces the first program and the third program replaces the second program in the subsequent acts. For example, at 114, a respective state of each QMI of the plurality of QMIs of the second program is preserved, then at 116, the third program is selected from the solver bucket and sent to the QPU. If there is not a third program in the solver bucket, method 100 ends at 126.

In some applications, executing a program for a fixed time duration submitted by an external system may be impractical. For example, a user may not accurately approximate the time required to execute a program and may underestimate the fixed time duration, thus necessitating state preservation of program QMIs. In some cases, it is possible to implement an algorithm that includes an incremental time duration on the QPU. The incremental time duration may be initially estimated by the user and modified by the algorithm based on a number of programs in a QPU.

Figure 2:
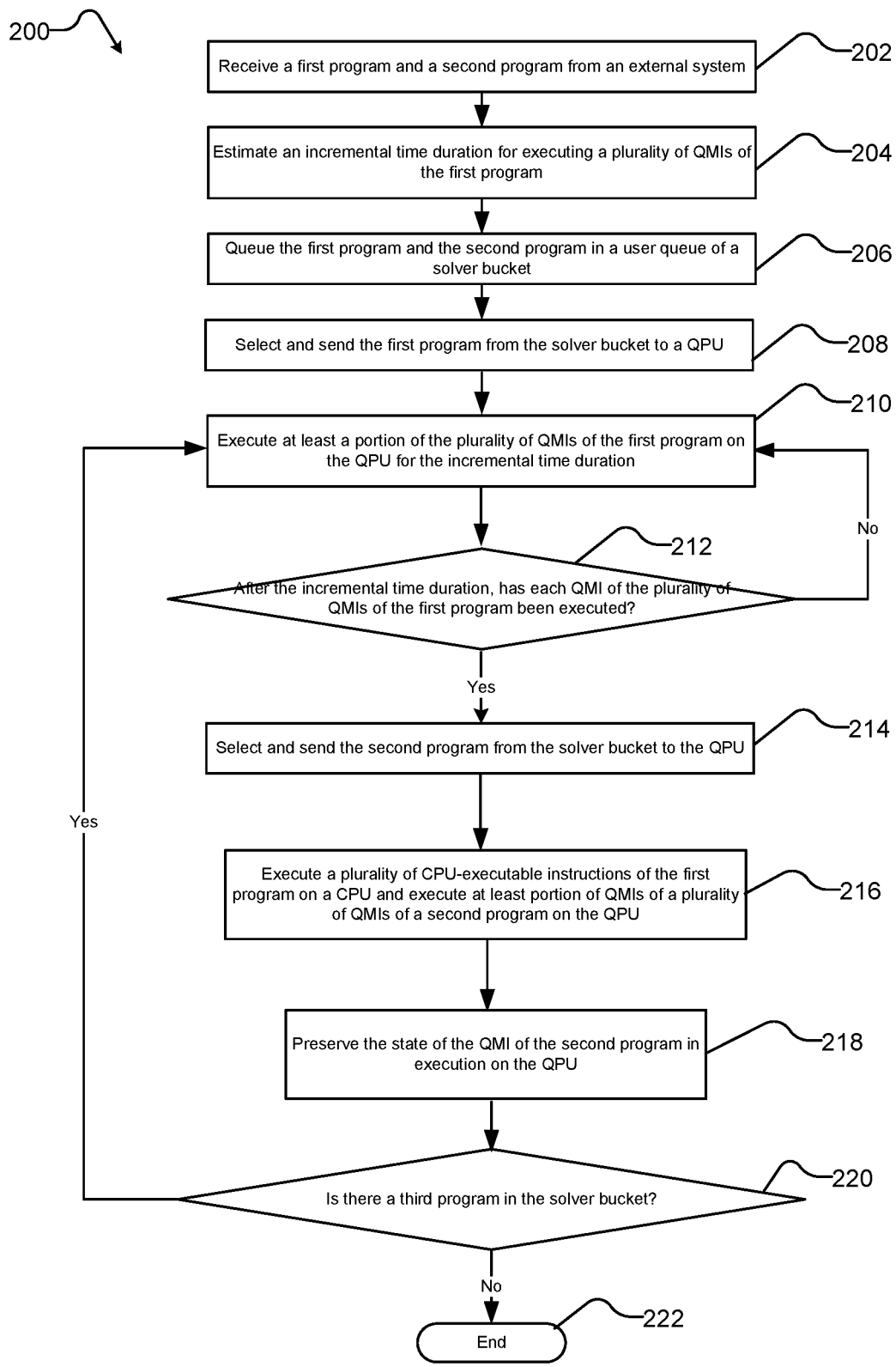
FIG. 2 is a flowchart illustrating a method for executing QMIs of a program for an estimated incremental time duration with state preservation of a second program without state preservation of a first program.

FIG. 2 is a flowchart illustrating a method 200 for executing QMIs of a first program for an estimated incremental time duration without preservation of QMIs of the first program. Method 200 includes acts 202-222, though in other implementations, certain acts can be omitted and/or additional acts can be added. Method 200 begins at act 202, for example in response to a user submitting a program or a problem to a scheduler and/or solver on the CPU.

At 202, a first program and a second program are each received from an external system. The first program can be a high performance program that includes QMIs that are intolerant of interruptions during execution on a QPU. The second program can be a low performance program that includes QMIs that are tolerant of interruptions during execution on a QPU.

At 204, an incremental time duration for executing a plurality of QMIs of the first program is estimated. For example, the incremental time duration can be estimated by a scheduler. In one implementation, the incremental time duration is estimated by the user and communicated via the first program.

At 206, the first program and the second program are each queued in a user queue of a solver bucket. A solver bucket can include a series of queues for problems of a certain incremental time duration.

At 208, the first program is selected from the solver bucket and sent from the solver bucket to a QPU. In one implementation, a probability of selecting the first program from the solver bucket is dependent on a project priority specified by an external system (e.g., a user), the incremental time duration, and a number of user queues in the solver bucket.

At 210, at least a portion of the plurality of QMIs of the first program is executed on the QPU for the incremental time duration. For example, a set of QMIs of a high performance program can be executed on a QPU for an incremental time duration that is estimated by a scheduler at act 104.

At 212, if each QMI of the plurality of QMIs of the first program has been executed after the incremental time duration, act 214 is performed. If each QMI of the plurality of QMIs of the first program has not been executed after the incremental time duration (i.e., if there are unexecuted QMIs in the plurality of QMIs of the first program), act 210 is continued until each QMI of the plurality of QMIs of the first program has been executed.

At 214, the second program is selected from the solver bucket and sent from the solver bucket to a QPU. For example, a low performance program can be selected from the solver bucket and sent to a QPU. In one implementation, a probability of selecting the second program from the solver bucket is dependent on a project priority specified by an external system (e.g., a user), the incremental time duration, and a number of user queues in the solver bucket.

At 216, a plurality of CPU-executable instructions of the first program is executed on a CPU and at least a portion of a plurality of QMIs of a second program is executed on the QPU. Executing CPU-executable instructions of the first program and executing at least a portion of the plurality of QMIs of the second program can occur simultaneously. In one implementation, executing at least a portion of the plurality of QMIs of the second program on a QPU can pause or stop (e.g., by quenching) when each CPU-executable instruction of the plurality of CPU-executable instructions of the first program has been executed on the CPU.

At 218, a respective state of each QMI of the plurality of QMIs of the second program is preserved. For example, results of completed annealing cycles and waveforms of a low performance program can be preserved for later resumption. In one implementation, a respective state of each QMI is preserved after the ongoing annealing cycle is ended by quenching. In one implementation, a respective state of each QMI is preserved at a point between an end of a first anneal cycle and a start of a second anneal cycle.

At 220, if there is a third program in the solver bucket, act 208 is performed, wherein the second program in the preserved state replaces the first program, and the third program replaces the second program in the subsequent acts. For example, at 210, execution of at least a portion of the plurality of QMIs of the second program in the preserved state is resumed, then at 214, the third program is selected from the solver bucket and sent to the QPU. If there is not a third program in the solver bucket, method 200 ends at 222.

In some implementations, it may not be necessary to preserve a state of QMIs of a program. For example, if QMIs of a low performance program are being executed on a QPU and a high performance program is queued, it may be desirable to finish executing a QMI of the low performance program as soon as possible without additional time to preserve the state of the QMI of the low performance program.

Figure 3:
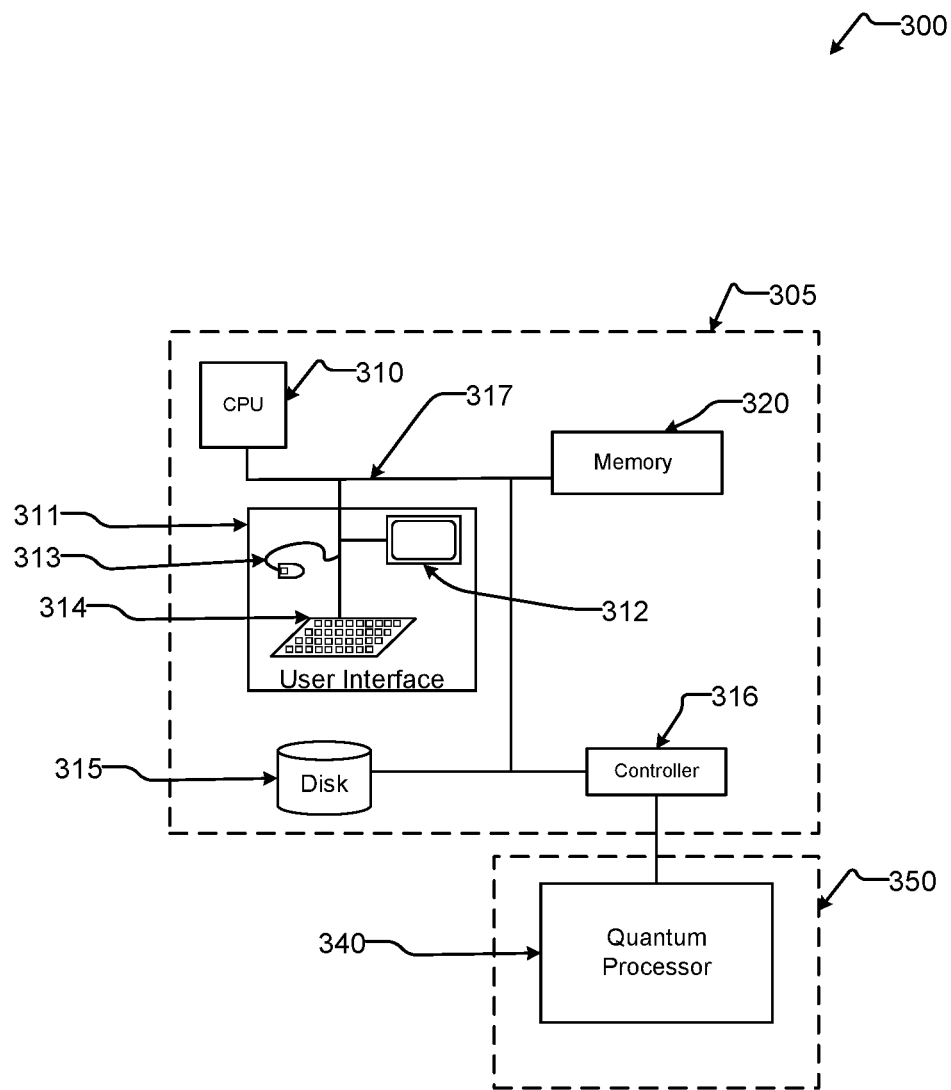
FIG. 3 is a schematic diagram of a hybrid computing system including a digital computer communicatively coupled to an analog computer, in accordance with the present methods and systems.

FIG. 3 illustrates a hybrid computing system 300 including a digital computer 305 coupled to an analog computer 350. In some implementations the analog computer 350 is a quantum computer. The example digital computer 305 includes a digital processor (CPU) 310 that may be used to perform classical digital processing tasks.

Digital computer 305 may include at least one digital processor (such as central processor unit 310 with one or more cores), at least one system memory 320, and at least one system bus 317 that couples various system components, including system memory 320 to central processor unit 310. The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Digital computer 305 may include a user input/output subsystem 311. In some implementations, the user input/output subsystem includes one or more user input/output components such as a display 312, mouse 313, and/or keyboard 314.

System bus 317 can employ any known bus structures or architectures, including a memory bus with a memory controller, a peripheral bus, and a local bus. System memory 320 may include non-volatile memory, such as read-only memory ("ROM"), static random-access memory ("SRAM"), Flash NANO; and volatile memory such as random access memory ("RAM") (not shown).

Digital computer 305 may also include other non-transitory computer or processor-readable storage media or non-volatile memory 315. Non-volatile memory 315 may take a variety of forms, including: a solid-state disk, a hard disk drive, an optical disk drive, and/or a magnetic disk drive. The optical disk can be a CD-ROM or DVD, while the magnetic disk can be a magnetic floppy disk or diskette. Non-volatile memory 315 may communicate with a digital processor via system bus 317 and may include appropriate interfaces or controllers 316 coupled to system bus 317. Non-volatile memory 315 may serve as long-term storage for processor- or computer-readable instructions, data structures, or other data (sometimes called program modules) for digital computer 305.

Although digital computer 305 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory, or to a solid-state disk that employs integrated circuits to provide non-volatile memory.

Various processor- or computer-readable instructions, data structures, or other data can be stored in system memory 320. For example, system memory 320 may store instruction for communicating with remote clients and scheduling use of resources including resources on the digital computer 305 and analog computer 350.

In some implementations, system memory 320 may store processor- or computer-readable calculation instructions to perform pre-processing, co-processing, and post-processing to analog computer 350. System memory 320 may store a set of analog computer interface instructions to interact with the analog computer 350.

Analog computer 350 may include an analog processor, such as quantum processor 340. The analog computer 350 can be provided in an isolated environment, for example, in an isolated environment that shields the internal elements of the quantum computer from heat, magnetic field, and other external noise (not shown).

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Pat. Nos. 9,727,527 and 9,471,880.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method to allocate time on a quantum processing unit (QPU) between one or more programs in a hybrid computing system comprising at least one central processing unit (CPU) of a digital computer and the QPU, the method comprising:

receiving a first program at the QPU from a queue, the first program comprising a plurality of quantum machine instructions (QMIs) and a plurality of CPU-executable instructions;

executing each of the plurality of QMIs of the first program on the QPU;

checking at incremental time durations for completion of execution the plurality of QMIs of the first program on the QPU;

subsequent to completion of the execution of the plurality of QMIs of the first program on the QPU, receiving a second program at the QPU from the queue, the second program comprising a plurality of QMIs and a plurality of CPU-executable instructions;

executing the plurality of CPU-executable instructions of the first program on the CPU of the digital computer while executing on the QPU at least a portion of the plurality of QMIs of the second program;

determining that each CPU-executable instruction of the plurality of CPU-executable instructions of the first program has been executed on the CPU of the digital computer;

in response to the determination that each CPU-executable instruction of the plurality of CPU-executable instructions of the first program has been executed on the CPU of the digital computer, pausing or stopping the execution on the QPU of the at least a portion of QMIs of the plurality of QMIs of the second program; and preserving a respective state of each QMI of the plurality of QMIs of the second program by preserving results of completed annealing cycles and waveforms of the second program for later resumption.

2. The method of claim 1, further comprising:

determining if there is at least one additional program in the queue;

for each of a number n of additional programs in the queue, receiving an $i^{th}$ one of the additional programs at the QPU from the queue;

executing each of a plurality of quantum machine instructions (QMIs) of the $i^{th}$ one of the additional programs on the QPU;

checking at incremental time durations for completion of execution of the plurality of QMIs of the $i^{th}$ one of the additional programs on the QPU;

receiving an $(i+1)^{th}$ one of the additional programs at the QPU from the queue;

executing a plurality of CPU-executable instructions of the $i^{th}$ one of the additional programs on the CPU of the digital computer while executing on the QPU at least a portion of QMIs of a plurality of QMIs of the $(i+1)^{th}$ one of the additional programs; and preserving a respective state of each QMI of the plurality of QMIs of the $(i+1)^{th}$ one of the additional programs.

3. The method of claim 1, further comprising:

determining an increment of time of the incremental time durations to be an estimated time for completion of execution of the plurality of QMIs of the first program on the QPU.

4. A hybrid computational system, comprising:

a quantum processing unit (QPU) comprising a plurality of qubits and couplers, the couplers operable to couple qubits;

at least one digital processor in communication with the QPU, the digital processor comprising at least one central processing unit (CPU); and at least one nontransitory processor-readable storage medium that stores at least one of processor-executable instructions or data which, when executed by the at least one digital processor, cause the at least one digital processor to:

cause the QPU to receive a first program from a queue, the first program comprising a plurality of quantum machine instructions (QMIs) and a plurality of CPU-executable instructions;

cause the QPU to execute at least a portion of the plurality of QMIs of the first program for a fixed time duration;

after the fixed time duration, determine whether each QMI of the plurality of QMIs of the first program has been executed;

determine whether to preserve a respective state of each QMI of the plurality of QMIs of the first program based on the determination of whether each QMI of the plurality of QMIs of the first program has been executed;

cause the QPU to receive a second program from the queue, the second program comprising a plurality of QMIs and a plurality of CPU-executable instruction;

subsequent to at least a determination of whether to preserve the respective state of each QMI of the plurality of QMIs of the first program, cause the CPU of the digital processor to execute the plurality of CPU-executable instructions of the first program while causing the QPU to execute at least a portion of QMIs of the plurality of QMIs of the second program;

determine that each CPU-executable instruction of the plurality of CPU-executable instructions of the first program has been executed on the CPU of the digital processor;

in response the determination that each CPU-executable instruction of the plurality of CPU-executable instructions of the first program has been executed on the CPU of the digital processor, pause or stop the execution on the QPU of the at least a portion of QMIs of the plurality of QMIs of the second program; and preserve a respective state of each QMI of the plurality of QMIs of the second program.

5. The hybrid computational system of claim 4 wherein the at least one nontransitory processor-readable storage medium that stores at least one of processor-executable instructions or data which, when executed by the at least one digital processor, further causes the at least one digital processor to:

preserve the respective state of each QMI of the plurality of QMIs of the first program in response to determining to preserve the respective state of each QMI of the plurality of QMIs of the first program based on a determination that at least one QMI of the plurality of QMIs of the first program has not been executed.

6. The hybrid computational system of claim 5 wherein the at least one nontransitory processor-readable storage medium that stores at least one of processor-executable instructions or data which, when executed by the at least one digital processor, causes the at least one digital processor to preserve results of one or more completed annealing cycles and waveforms of the first program for later resumption.

7. The hybrid computational system of claim 5 wherein the at least one nontransitory processor-readable storage medium that stores at least one of processor-executable instructions or data which, when executed by the at least one digital processor, causes the at least one digital processor to:

after executing the plurality of CPU-executable instructions of the first program on the CPU of the digital processor and while causing the QPU to execute at least a portion of QMIs of the plurality of QMIs of the second program on the QPU, preserve a respective state of each QMI of the plurality of QMIs of the second program; and after preserving the respective state of each QMI of the plurality of QMIs of the second program, causes the QPU to resume execution of each QMI of the plurality of QMIs of the first program from the preserved state of each QMI of the plurality of QMIs of the first program.

8. The hybrid computational system of claim 4 wherein the at least one nontransitory processor-readable storage medium that stores at least one of processor-executable instructions or data which, when executed by the at least one digital processor, causes the at least one digital processor to:

determine if there is at least one additional program in the queue;

for each of a number n of additional programs in the queue, execute at least a portion of a plurality of quantum machine instructions (QMIs) of an $i^{th}$ one of the additional programs on the QPU for a fixed time duration;

after the fixed time duration, determine whether each QMI of the plurality of QMIs of the $i^{th}$ one of the additional programs has been executed;

determine whether to preserve a respective state of each QMI of the plurality of QMIs of the $i^{th}$ one of the additional programs based on the determination of whether each QMI of the plurality of QMIs of the $i^{th}$ one of the additional programs has been executed;

receive an $(i+1)^{th}$ one of the additional programs at the QPU from the queue; and execute a plurality of CPU-executable instructions of the $i^{th}$ one of the additional programs on the CPU of the digital processor while causing the QPU to execute at least a portion of QMIs of a plurality of QMIs of the $(i+1)^{th}$ one of the additional programs, where n and i are each integers.

9. The hybrid computational system of claim 4 wherein the at least one nontransitory processor-readable storage medium that stores at least one of processor-executable instructions or data which, when executed by the at least one digital processor, further causes the at least one digital processor to:

determine if there is at least one additional program in the queue;

for each of a number n of additional programs in the queue, cause the QPU to receive an $i^{th}$ one of the additional programs at from the queue;

cause the QPU to execute each of a plurality of QMIs of the $i^{th}$ one of the additional programs;

check at incremental time durations for completion of execution of the plurality of QMIs of the $i^{th}$ one of the additional programs on the QPU;

cause the QPU to receive an $(i+1)^{th}$ one of the additional programs from the queue;

execute a plurality of CPU-executable instructions of the $i^{th}$ one of the additional programs on the CPU of the digital processor while causing the QPU to execute at least a portion of QMIs of a plurality of QMIs of the $(i+1)^{th}$ one of the additional programs; and preserve a respective state of each QMI of the plurality of QMIs of the $(i+1)^{th}$ one of the additional programs.

10. The hybrid computational system of claim 4 wherein the at least one nontransitory processor-readable storage medium that stores at least one of processor-executable instructions or data which, when executed by the at least one digital processor, further causes the at least one digital processor to:

determine an increment of time of the incremental time durations to be an estimated time for completion of execution of the plurality of QMIs of the first program on the QPU.

\* \* \* \* \*